United States Patent

[11] 3,596,121

[72] Inventor  Sheldon S. L. Chang
              Setauket, N.Y.
[21] Appl No  856,715
[22] Filed    Sept. 10, 1969
[45] Patented July 27, 1971
[73] Assignee Robbins & Myers, Inc.
              Springfield, Ohio

[54] ELECTRIC INDUCTION MOTOR
     5 Claims, 8 Drawing Figs.
[52] U.S. Cl. .................................................. 310/166,
                                              310/67, 310/211
[51] Int. Cl. ............................................... H02k 17/00
[50] Field of Search ........................................ 310/211,
                       74, 125, 67, 166, 167, 232, 66, 58, 62, 63

[56]              References Cited
                UNITED STATES PATENTS
2,445,095   7/1948   Winther ........................ 310/166
2,479,279   8/1949   Tooley ......................... 310/67
2,624,856   1/1953   Younger ....................... 310/74
2,829,287   4/1958   Font ........................... 310/67
3,002,118   9/1961   Papst .......................... 310/67
3,054,010   9/1962   Breitling ...................... 310/166
3,353,251   11/1967  Linkous ....................... 310/166
3,492,516   1/1970   Fujiwara ...................... 310/67

Primary Examiner—Milton D. Hirshfield
Assistant Examiner—R. Skudy
Attorney—Melville, Strasser, Foster and Hoffman ABSTRACT: An induction motor capable of being operated single phase, polyphase, capacitor run, shaded pole, etc., having an inner wound member constituting a primary and an outer squirrel cage member. Either the inner or outer member may be the stator. The outer member is provided with a supporting member of magnetic material which not only gives mechanical support to the outer member but also serves as a substantial part of the return magnetic path making it possible to reduce the depths below slot of the outer member drastically, and the eddy current and hysteresis loss of the supporting member add to the induced currents in the squirrel cage to produce additional induction motor torque so that the physical size of the squirrel cage can be substantially reduced.

PATENTED JUL 27 1971 3,596,121

INVENTORS
Sheldon S.L. Chang
BY Melville, Strasser, Foster and Hoffman
ATTORNEYS

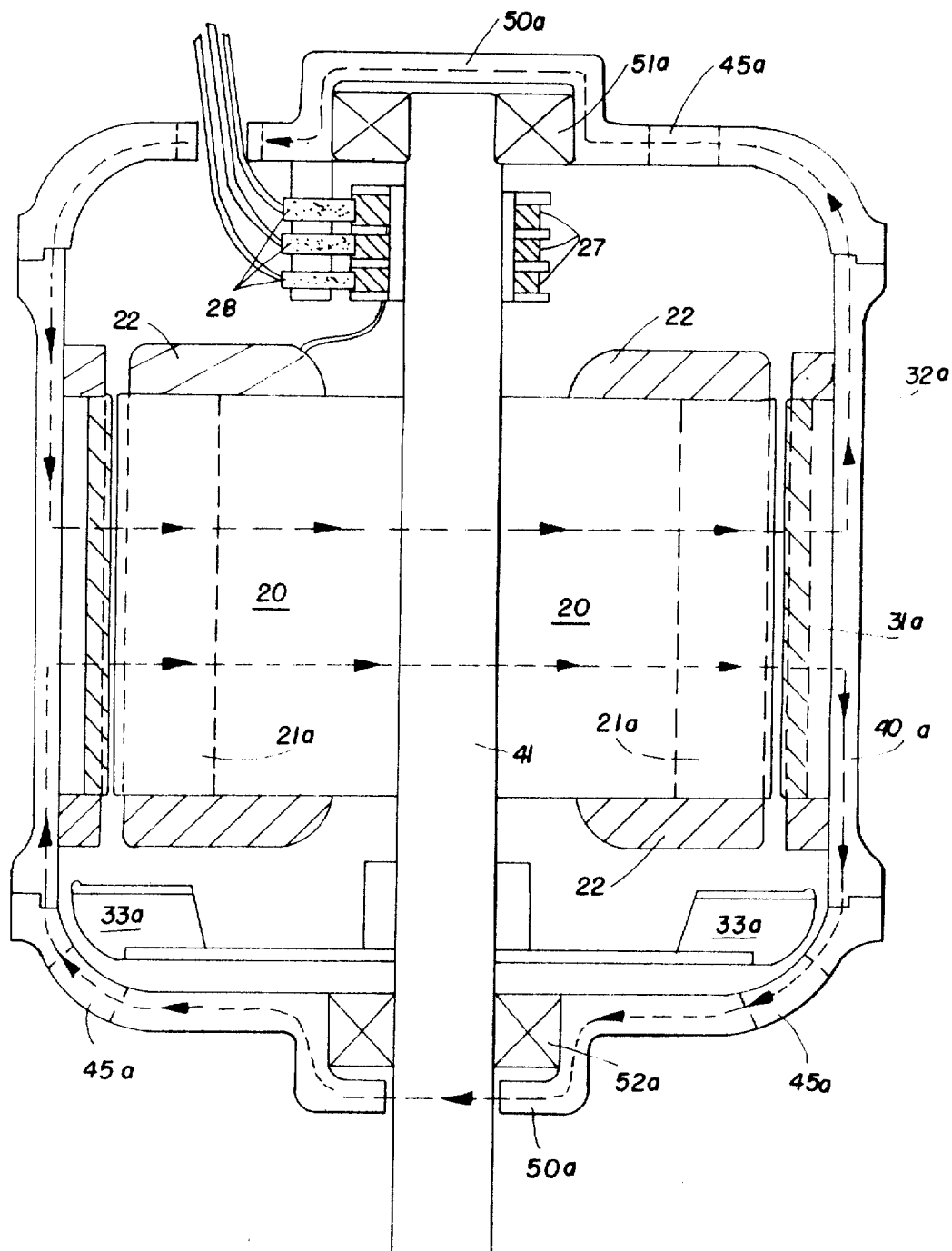

3,596,121

1

ELECTRIC INDUCTION MOTOR

BRIEF SUMMARY OF THE INVENTION

An induction motor generally comprises a member with energized windings known as the primary and a member which is not connected to a power source but has currents induced in its windings and called a secondary or squirrel cage.

Generally, induction motors have had an outer primary member and an inner squirrel cage which rotates as a result of the induced currents on the inside of the primary.

According to the present invention the primary and secondary are reversed, i.e. the primary member having the energized windings is the inner member and the squirrel cage or secondary is the outer member. The squirrel cage is supported by means of a bearing with respect to the inner member and either the inner or outer member may be fixed and the other member free to rotate.

This reversal of the elements produces some unexpected and highly beneficial results. It is known that the entire loss in a primary is pure loss but the copper and iron losses in the secondary, which are induced by the forward rotating fundamental flux, is absolutely necessary to the generation of motor torque. It is well established that the generated torque is equal to the total secondary losses (copper and iron) induced by the forward rotating fundamental flux divided by the slip speed. This is true with respect to CGS or MKS units. In English units there is a proportionality constant. Thus with increased secondary losses for a given value of slip, the motor torque is increased at that value of slip. By the same token, the same torque can be obtained at less slip. As will be pointed out hereinafter, a motor having the same torque as another at less slip or having greater torque at the same value of slip would be more efficient.

It must be understood, of course, that the above analysis is only valid for the forward rotating fundamental flux and that the secondary iron and copper losses, due to harmonic flux and reversed rotating fundamental flux, act as a drag or braking torque on the motor.

Among the objects of the invention are the provision of an induction motor weighing approximately 50 percent less than a conventionally constructed induction motor but operating with equal or better efficiency than a conventional motor.

Another object of the invention is to provide an induction motor which is inexpensive to manufacture and is easily cooled, and which can be made flat in shape whereby it is readily adaptable to various household applications. Still another object of the invention is to provide an induction motor which can be easily assembled and disassembled and which can be manufactured in all known types, as for example, single phase, polyphase, capacitor run, shaded pole, etc.

BRIEF DESCRIPTION OF THE DRAWINGS

FIG. 7 is a diagram showing the path of magnetic flux in a motor according to the embodiment of FIG. 3.

2

DETAILED DESCRIPTION OF THE INVENTION

Figure 1:
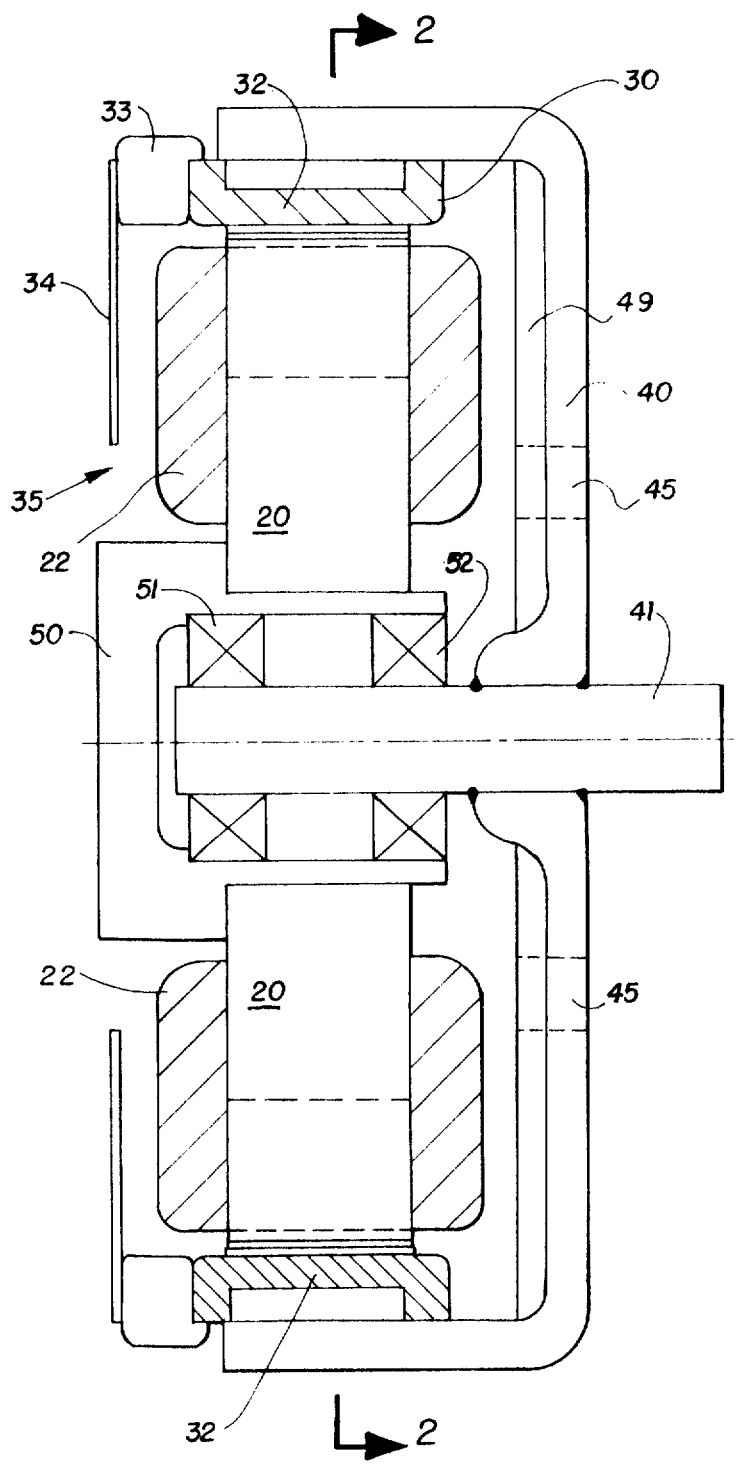
FIG. 1 is an actual cross section of an induction motor according to the present invention wherein the outer squirrel cage member is the rotor.
Figure 2:
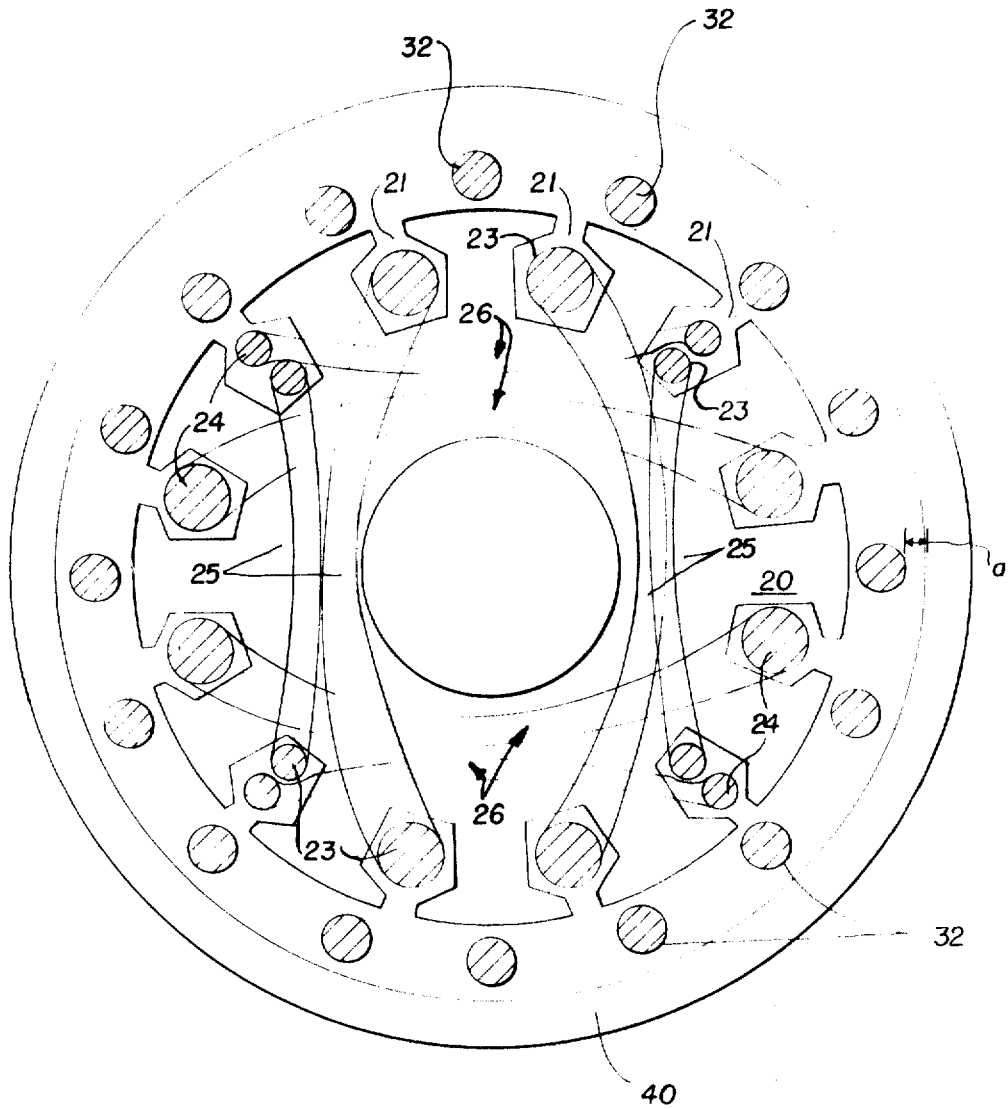
FIG. 2 is a cross-sectional view of the same on the line 2–2 of FIG. 1.

Referring first to FIG. 1, the motor of this invention comprises an inner member or primary 20 of laminated steel and a winding 22 thereon. The winding 22, as best seen in FIG. 2, comprises a main winding 23 and an auxiliary winding 24. The coil ends of the main winding 23 are indicated at 25, and the coil ends of the auxiliary winding at 26. The outer member 30 is also of a laminated steel structure and is provided with the cast-in-place squirrel cage winding 32. The supporting member 40 is of magnetic material and is secured to a shaft 41. A bearing holder 50 is rigidly attached to the inner member 20 and is provided with bearings 51 and 52 for the shaft 41. With the member 50 fixed, the inner member 20 is likewise fixed and the supporting member 40 together with the outer member 30 and the squirrel cage winding 32 is free to rotate in the bearings 51, 52. The squirrel cage winding 32 is provided with die cast fan blades 33 and baffles 34 are secured to the fan blades 33 to draw air through the openings at 35 and to the ventilating holes 45 to cool the windings 22. Secured to the inside of the supporting member 40 is a disc 49 of highly conductive material such as copper or aluminum. The end leakage flux rotates, and induces current in the disc 49 and thereby increases the starting and pullout torque.

As best seen in FIG. 2, the main and auxiliary windings 23 and 24 are inserted in the slots 21 of the member 20. As will be understood, when the two windings 23 and 24 are energized by alternating currents which are out of phase with each other a rotating magnetic field is set up in the airgap. Electric currents are induced in the squirrel cage winding 32, thus generating an induction motor torque in the usual manner.

Figure 3:
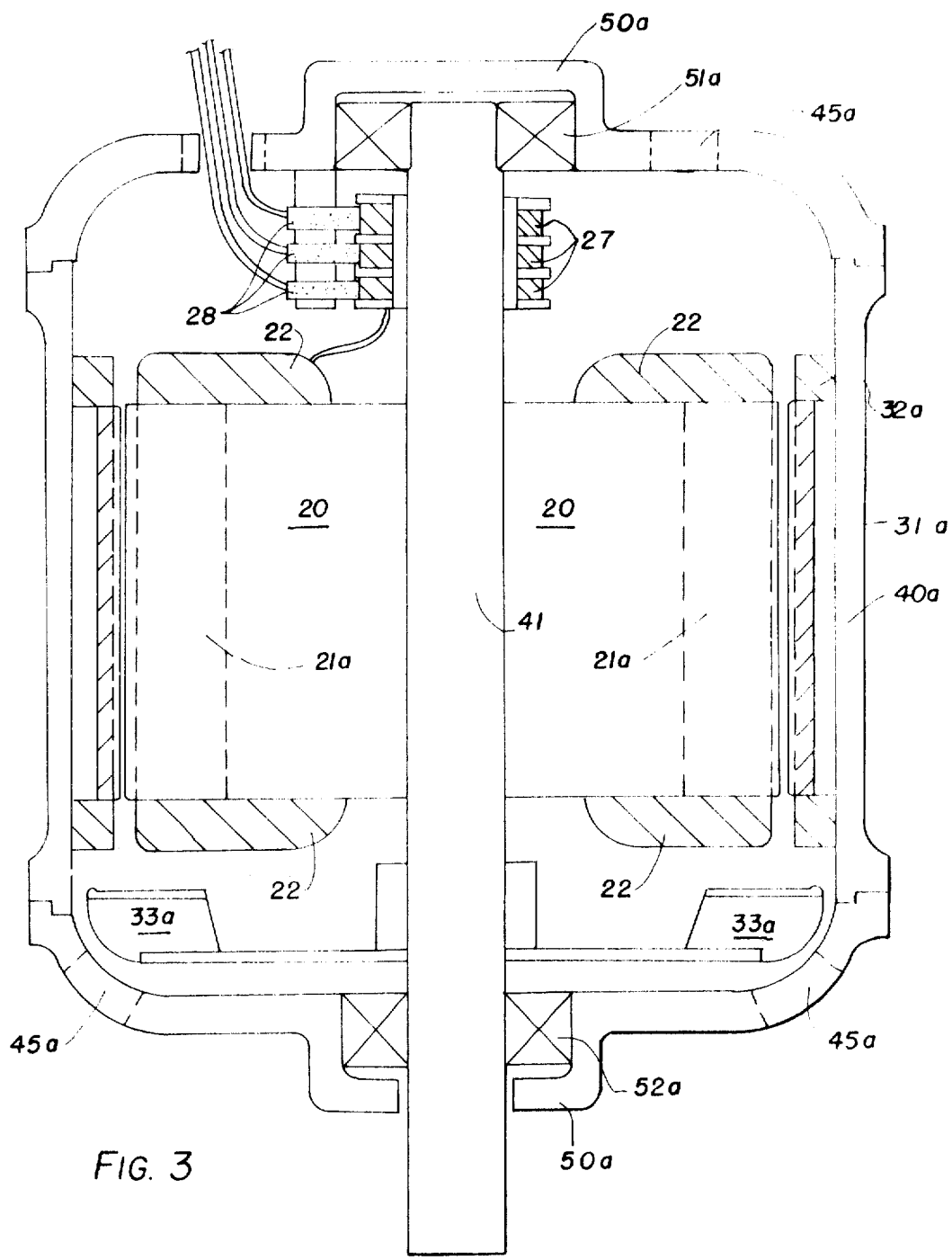
FIG. 3 is an axial cross-sectional view of a different embodiment of the invention wherein the outer squirrel cage member is the stator, and the primary member rotates.

In FIG. 3 there is shown an alternative embodiment of the present invention wherein the outer member or squirrel cage is held stationary and the inner member or primary rotates against the magnetic field. This is in effect the reverse of the embodiment of FIGS. 1 and 2. The inner member is again indicated at 20 and is fixed to the motor shaft which is again indicated at 41. Slip rings 27 and brushes 28 are provided to supply alternating currents to the windings 22 which rotate with the shaft 41. A centrifugal fan 33a and ventilating holes 45a provide for cooling of the windings. The several parts shown in FIG. 3 have been given the same reference numerals with the subscript a as were used in FIG. 1 to show that functionally they are the same.

Figure 4:
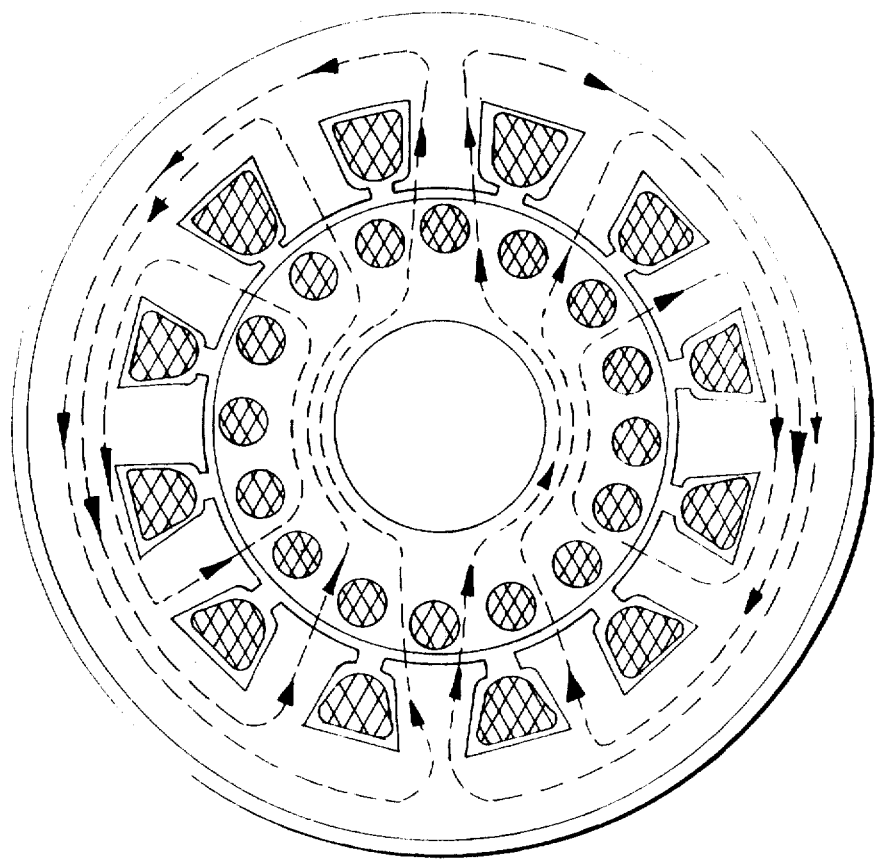
FIG. 4 is a diagrammatic cross-sectional view through a typical conventionally constructed induction motor showing the magnetic path which is closed within each cross section of the motor.

Referring now to FIG. 4, there is shown a diagram of the flow of magnetic flux in a conventional induction motor. The magnetic path is closed within each cross section of the motor as shown by the broken lines in FIG. 4. It will be noted that in the conventional induction motor of FIG. 4 there is sufficient depth below the slots so that each magnetic flux line completes its closed path within the lamination itself.

Figure 5:
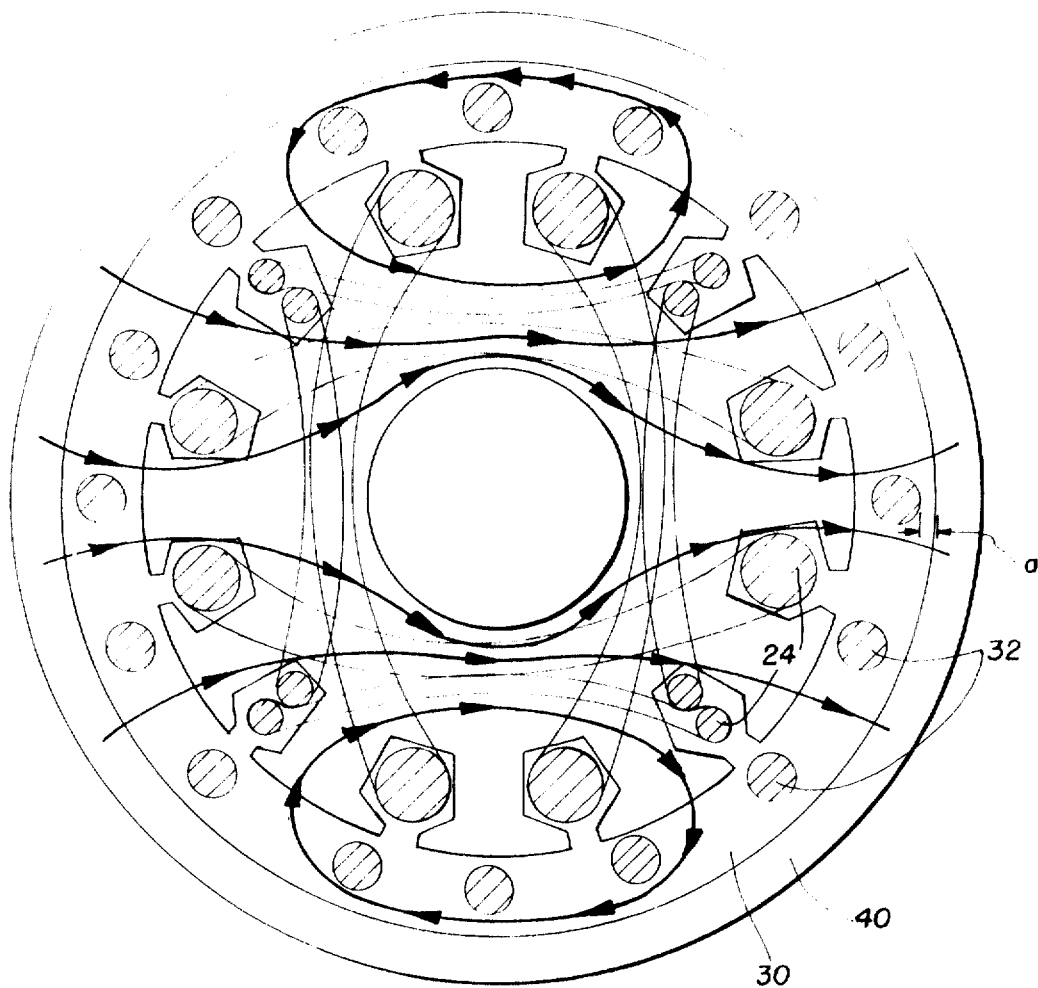
FIG. 5 is a diagram similar to FIG. 2 showing the path of magnetic flux in a motor according to the present invention.
Figure 6:
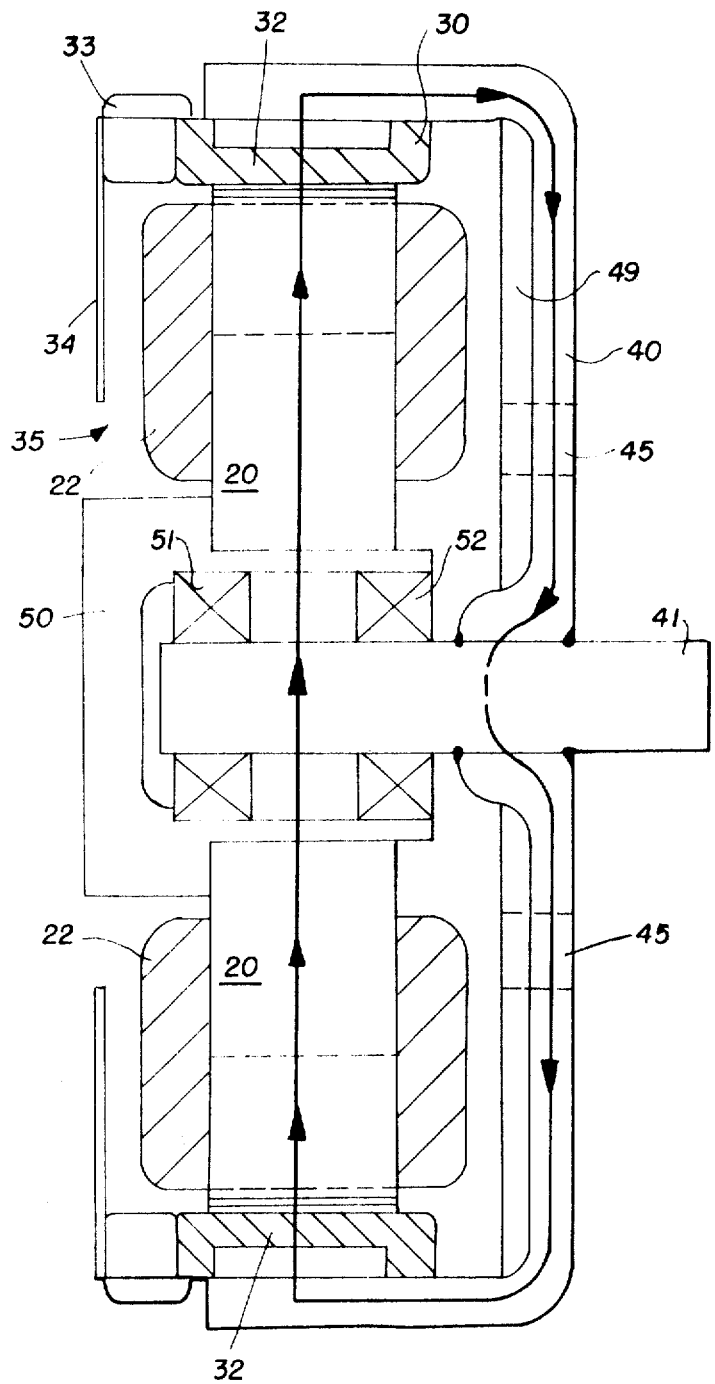
FIG. 6 is a view similar to FIG. 1 showing the path of magnetic flux in a motor according to FIGS. 1 and 2.

Comparing this situation now with a motor of the present construction, as shown in FIG. 5, the depths "a" below the slots of the outer member is not nearly large enough to carry all the flux so that a large majority of the flux goes into the supporting member 40 and completes its path by flowing through the member 40 as best seen in FIGS. 6 and 7.

It may be observed that in the conventionally constructed induction motor, care is usually taken to keep the alternating flux from entering the supporting member or the motor shell, as it is generally called. The reason for this is that in a conventionally constructed motor the outer member is the primary. The flux frequency is the same as the line frequency so that the loss is high and every bit of loss is a pure loss.

As distinguished from this, in a motor of the present invention the outer member is the secondary and its flux is at slip frequency. Therefore the loss is low and contributes to the squirrel cage effect.

It must be observed that the supporting member 40 of the present invention performs three functions. First, it gives mechanical support to the outer member so that, for example in the embodiment of FIG. 1, it can rotate freely about the inner member. Second, it serves as a substantial part of the return magnetic path whereby the depth below slot of the outer member can be drastically reduced, thereby making for a smaller motor for a given power. Third, the eddy current and hysteresis loss in the supporting member add to the induced currents in the squirrel cage to produce induction motor torque whereby the physical size of squirrel cage can be very substantially reduced.

All of the above factors contribute to the relatively small outside diameter of the outer member. In a conventional construction the outside diameter of the outer member is approximately 1.8 to 2 times the airgap diameter in a two pole motor or 1.5 to 1.7 times the airgap diameter in a four or six pole motor. With a motor according to the present invention in order to produce the same torque with the same airgap diameter and stack length, the outside diameter of the outer member need only be 1.15 to 1.2 times the airgap in all two, four and six pole motors. Since the total weight of an induction motor is approximately proportional to the second power of the outside diameter of the outer member, it is clear that a motor according to the present invention will weigh only about one-half as much as a conventionally constructed motor of the same horse power and speed.

In the preferred arrangement, the depth below slot of the outer member is substantially less than the tooth width multiplied by the number of teeth per pole and divided by three, and is approximately equal to and sometimes less than the width between the slots, which is equal to the tooth width. The depth below slot need only be sufficient to make the outer member of adequate mechanical strength. Another reason for maintaining the depth below slot of the outer member is to bypass the harmonic flux, especially the tooth harmonics, so that most of the harmonic flux does not flow in the supporting member and therefore does not induce any appreciable loss in the supporting member. Still another reason is to bypass the reversedly rotating flux in a single phase motor under running condition so that it would not induce appreciable loss in the supporting member. Because the harmonic flux and reversedly rotating flux induce currents of relatively high frequency in the secondary, any small amount of such flux can induce appreciable loss and such loss acts as a drag or braking torque on the motor and is therefore to be avoided. It does not require much depth below slot of the laminated structure to bypass the harmonic and reversedly rotating flux but it is very necessary to provide such bypass.

It will also be observed that there is a relatively short length of the magnetic path and coil ends so that the primary iron and copper losses are considerably less at the same flux and current densities, and will serve to add to the efficiency of an induction motor according to the present disclosure.

Figure 8:
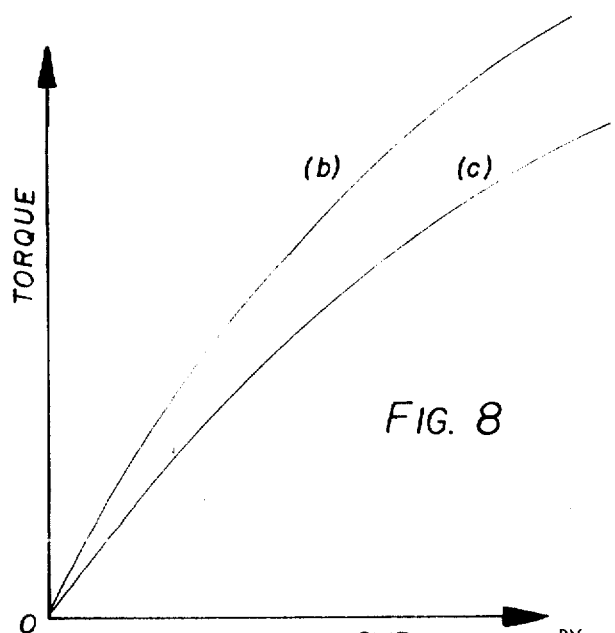
FIG. 8 is a graph useful in understanding the advantages of the present invention.

In FIG. 8 there are shown slip versus torque characteristic curves with increased secondary losses for a given value of slip. The motor torque is increased at that value of slip as shown by the characteristic curve $b$. The characteristic curve $c$ represents a motor without much secondary iron loss. It will be clear from FIG 8 that the same torque can be obtained at less slip with a motor having the characteristic $b$. Thus it is clear that a motor having the characteristic $b$ is more efficient that a motor represented by characteristic $c$, assuming that their primaries are identical. The motor of the present invention will have a characteristic curve such as that shown at $b$ in FIG. 8.

It is believed that the foregoing constitutes a full and complete disclosure of the invention and no limitations are intended except insofar as specifically set forth in the claims which follow.

The embodiments of the invention in which an exclusive property or privilege I claim are defined as follows:

1. An induction motor comprising: an inner member of laminated steel constituting a primary, said inner member having a set of windings arranged to provide an even number of poles; an outer member of laminated steel constituting a secondary, said outer member having slots containing a squirrel cage winding facing said windings of said inner member, the depth of laminated steel below said slot in said outer member being substantially less than the tooth width between said slots multiplied by the number of slots and divided by three times the number of said poles; a supporting member of magnetic material rigidly attached to said outer member and having a rotating bearing support with respect to said inner member, said supporting member constituting an essential part in completing the magnetic path for the alternating flux; and means for energizing the windings of said inner member with alternating current to produce an alternating magnetic flux linking said squirrel cage winding with said windings of said inner member, whereby said depth of laminated steel is too small to carry all the flux and forces a majority of said flux into said supporting member.

2. An induction motor according to claim 1, in which the depth below the slots of said outer member is approximately equal to the tooth width of said outer member.

3. An induction motor according to claim 1, wherein said inner member is fixedly mounted to constitute a stator, and said outer member and said supporting member together constitute a rotor, rotating freely and concentrically about said inner member.

4. An induction motor according to claim 1, wherein said supporting member completely encloses both said outer and inner members and constitutes a stationary motor frame, and said inner member is free to rotate concentrically within said outer member, and wherein slipring means are provided to energize the windings of said inner member while it rotates.

5. An induction motor according to claim 1, wherein a disc of highly conductive material is secured to the interior side of said supporting member.